May 16, 1933.  H. DALTON  1,909,853
DENTAL MIRROR
Filed April 5, 1932
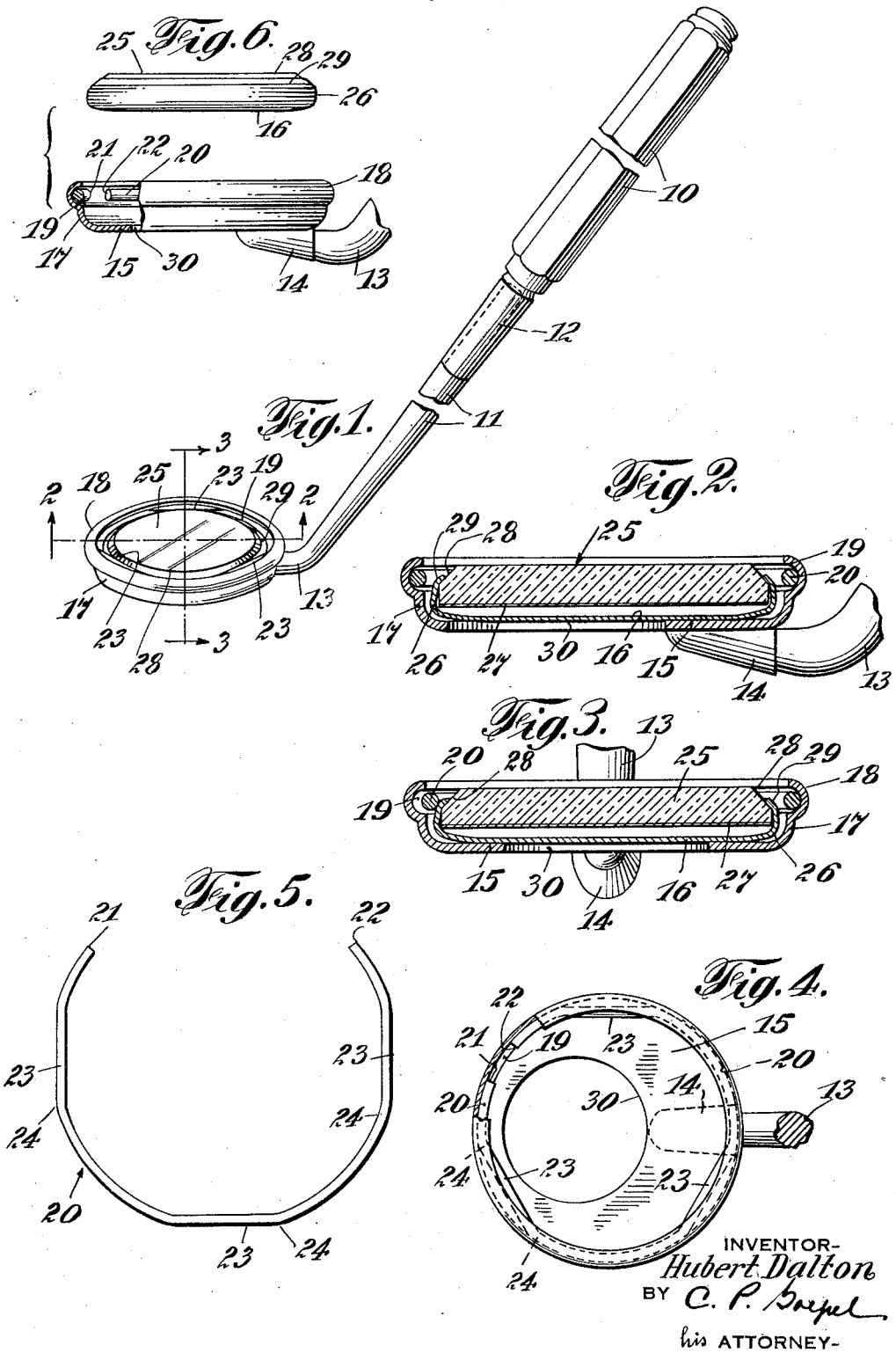
INVENTOR-
Hubert Dalton
BY C. P. Goepel
his ATTORNEY- Patented May 16, 1933

1,909,853

UNITED STATES PATENT OFFICE

HUBERT DALTON, OF RUMSON, NEW JERSEY

DENTAL MIRROR

Application filed April 5, 1932. Serial No. 603,270.

This invention relates in general to mirrors, and more particularly to dental hand mirrors used for oral exploration and as an aid for properly filling teeth.

Dental mirrors commonly used have the reflecting element set permanently in a holder connected to the stem of the handle. Oftentimes, the reflecting or mirror element chips or cracks due to contact with the drill used by the dentist while working on a patient's teeth. The cracking and chipping of the glass occurs most where a nervous or jumpy patient is being operated on. Also, when the mirrors are being sterilized, the chemicals used may eventually seep into the sides of the mirror holder and attack the reflecting film on the underside of the mirror glass thus rendering the mirror useless. In such instances, it is necessary for the dentist either to discard the mirror holder entirely and buy and use a new one, or, if he wants the mirror element replaced, the cost of replacement is relatively high, since the mirror element is a permanent part of the device and requires relatively considerable time for replacement.

It is an object of my invention, therefore, to obviate the above disadvantages by providing a simply constructed and relatively economical mirror device for easily replaceable mirror elements.

It is another object of my invention to provide a mirror device in which the reflecting unit can be easily snapped into and removed from the holder therefor.

It is one other object of my invention to provide a mirror device which contains a tensioned distensible wire, in connection with a holder whereby a reflecting element included in the device is rigidly retained in said holder.

With the above objects and features in view, the invention contemplates the formation of a dental mirror having a holder in connection with a stem on the handle thereof, said holder having a socket with an inset basal portion and an annular rim projecting upwardly therefrom. The holder accommodates a reflecting element having preferably a metal backing and is easily removable therefrom by applying upward pressure through an opening in the basal portion of the socket and against said metal backing. In order to retain the reflecting element in position within the holder, a tensioned wire spring is provided, fitting in a groove in the annular rim and bearing against the reflecting element.

The invention in its preferred embodiment includes a mirror holder which further consists in the new and novel features of construction and the arrangement of the several parts.

In the accompanying drawing, illustrating and embodying a preferred form of the invention, Fig. 1 is a fragmentary perspective view of the dental mirror embodying the improvements.

Fig. 2 is an enlarged cross-section taken on line 2—2 of Fig. 1.

Fig. 3 is an enlarged section taken on line 3—3 of Fig. 1.

Fig. 4 is a plan view of the mirror holder of the embodiment showing sides of the wire spring extending therefrom, and an opening in the bottom thereof.

Fig. 5 is a detailed view of the spring expanded when not in the groove of the holder; and Fig. 6 is an expanded side view of the mirror element and a side fragmentary view of the holder showing the wire spring contained therein.

Similar reference characters designate like and corresponding parts throughout the drawing.

Referring in detail to the accompanying drawing which, for the sake of illustration and clarity show a preferred embodiment, a dental mirror having the usual handle 10 is provided with preferably a removable shank or stem portion 11 containing a diminished terminal threaded portion 12 screwed into the handle 10. The oppositely terminating end 13 of the stem tapers and is abruptly enlarged as a base 14 which merges with the lower surface or bottom 15 of the socket of a mirror holder 16. The holder is attached to stem 11 by welding or other suitable means. The holder 16 has a socket containing the bottom 15, and an upwardly extending cylindrical wall 17 to form a container in which the wall 17 merges into the bottom 15 to form a curved outline at this particular part of the holder, thereby imparting to said socket a cup shaped appearance. The upper portion of cylindrical wall 17 contains an annular rim 18, having a relatively larger overall outside diameter than that of cylindrical wall 17. The rim is outwardly curved or convex in contour and forms a circumferential groove 19 facing the center of the holder for accommodating a tensioned wire spring 20 therein.

The type of wire spring used in the rim is of resilient metal and normally expands when in a free condition, as shown in Fig. 5 of the drawings. The hair spring wire 20 used in the present embodiment is expandible, terminating at the free ends 21 and 22, and has substantially a polygon shape in which the sides 23 are substantially straight, while the angular or nicked portions 24 are somewhat curved to permit smooth contact with the wall of the circumferential groove 19. Although spring 20 may be of a circular or any other form, it is preferably, as above said, of a substantially polygonal shape, and upon insertion into the circumferential groove 19 permits the sides 23 to extend outwardly of the groove and project toward the center of the holder, while the nicked or angular portions 24 press against the wall of the groove. When inserted into the circumferential groove 19, wire spring 20 is under tension and affords resistance to the sides thereof. It is to be noted that the sides 23 of the spring as they project into the holder are adapted to bear against a mirror element 25 as will be hereinafter described.

The mirror element 25 may be of the plane or curved surface type and has a metal backing 26 for protecting the reflecting surface 27 against scratching or wearing, and is beveled or cammed at the top peripheral edge 28 for engagement by the backing 29. The edge 29 of the metal backing 26 overlaps a portion of the peripheral edge 28, and is crimped thereon so as to provide a unitary reflecting device which can be easily handled without damage. The mirror element and backing forms a unit of such dimension as to be easily insertable into the holder and removable therefrom, the diameter of said holder being such that the mirror is surrounded on all sides thereby and is protected from contact with a drill or other instrument used during an operation on a patient's mouth.

Upon inserting the mirror unit into the holder one edge of the mirror is first inserted while bearing against the top of the mirror with one finger. This pressure is transmitted against the sides 23 of wire spring 20, thereby causing them to yield in the groove and bend due to the ends thereof being free. Further pressure exerted on the mirror element causes the same to slide easily into the holder and snap because of the wire spring sides attempting to resume their normal position, so that the respective planes of the reflecting unit and holder are substantially parallel.

The pressure applied during the insertion of the mirror causes the sides of the spring to be moved inwardly toward the groove, thus increasing the tension on the wire spring. Once the mirror is inserted and the wire spring is under extra tension, the sides thereof invert toward their normal tension and position, and bear against the upper peripheral portion of the mirror to retain the same rigidly and firmly in place in the socket of the holder. It is to be noted that the peripheral edge of the top of rim 19 is in alignment with the cylindrical wall 17 and that the depth of the holder as a whole is sufficient to accommodate a mirror element of ordinary thickness or depth and protect the sides and bottom thereof from any damage.

The mirror element used in connection with the holder may be easily removed or replaced, particularly if it has become defective or damaged during use. The bottom portion of the socket of holder 16 has an opening or cutaway 30 through which the end of the operator's finger is inserted and an upward pressure applied against the bottom of the mirror. The pressure on mirror element 25 is transmitted to the sides of wire spring 20, whereupon said sides yield and permit the mirror to be moved out of the holder. The spring after the removal of the mirror element of the holder reverts to its normal state of tension in the groove.

It is apparent from the foregoing description, taken in connection with the accompanying drawing, that I provide a simply constructed mirror holder having a cylindrical socket with an opening at its base and a peripheral rim at the top. The rim is provided with a radially extending circumferential groove, the edges of which are in alignment with the cylindrical wall of the socket.

Also, I provide a tensioned wire spring for fitting into said groove and having, preferably, sides projecting angularly from the groove towards the axis of the socket. The wire spring has free ends to permit compression for insertion into the grooves of said rim. Also in connection with the use of the holder and wire spring I provide a removable and replaceable mirror or reflecting element which can be easily slid into the socket of the holder and retained in position therein by engagement of the wire spring with the periphery of the reflecting element. The wire spring being resilient and normally under tension exerts pressure against the mirror element to prevent any movement thereof out of the holder. Furthermore, the holder has an opening in the base of the socket to permit application of upward pressure against the reflecting element to remove the same therefrom. Upon the removal of the mirror element from the holder, the pressure is transmitted against the sides of the wire, which give and the element moves out therefrom while the spring reverts to its normal tension with respect to the groove.

While the embodiment herein is described for use by dentists, it is to be understood that a mirror holder of the type herein disclosed may be used in connection with surgical and other kinds of instruments requiring the use of such mirrors.

While I have disclosed and illustrated one embodiment herein, it is evident and to be understood that various modifications as to form, structure and use of materials may be made without departing from the spirit and scope of the invention as defined in the following claims.

I claim:

1. In a dental or surgical mirror, having a handle and a stem portion, the improvement comprising a mirror holder in connection with the stem and having a socket and a rim projecting from one end thereof, said rim having a groove coextensive therewith and projecting radially from the wall of said socket, a tensioned polygonal wire spring with free ends and having a plurality of sides spaced apart from the wall of the groove and angular portions in point contact with said groove, and a reflecting element with a beveled periphery in contact with the sides of the wire spring, said socket having an opening at its basal portion for applying pressure against the reflecting element to remove the same from the holder.

2. A dental mirror comprising a holder having a socket with a basal seat portion, and an annular rim projecting therefrom having a circumferential groove facing the center of the seat portion, a polygonal-shaped wire spring in said groove making contact with the wall of the groove at spaced intervals while the sides of the wire not making contact with the wall extend toward the center of the seat portion, and a removable mirror element seated in said basal seat portion and having a peripheral, beveled portion in contact with the extending sides of the spring whereby the mirror element is firmly retained in the seat of the holder, said seat portion having an opening therein for permitting contact with the mirror element to remove the same from the holder.

3. In a dental mirror as herein described, the combination with an open bottom holder having a socket with a basal seat portion and an annular rim radially projecting from the top of the seal portion forming a peripheral groove facing the center of the seat portion, of an easily removable reflecting element in the holder, said element having a peripherally beveled edge, and an open polygonal spring wire set in said groove, having sides projecting from the groove and bearing against the beveled edge of the reflecting element while the annular portions of said wire bear against the wall of the groove, the sides of said wire being adapted to yield upon pushing the reflecting element into the socket and then to resume their normal projected position, said reflecting element when in the socket having its surface plane normally below that of the rim.

In testimony that I claim the foregoing as my invention, I have signed my name hereto.

HUBERT DALTON.